United States Patent
Carlson et al.

(10) Patent No.: US 11,845,886 B2
(45) Date of Patent: Dec. 19, 2023

(54) MOISTURE CURABLE POLYURETHANE HOT MELT ADHESIVE COMPOSITION HAVING LOW LEVELS OF DIISOCYANATE MONOMER

(71) Applicant: H.B. Fuller Company, St. Paul, MN (US)

(72) Inventors: Brian W. Carlson, Woodbury, MN (US); Sudipto Das, St. Paul, MN (US); Daniel J. Van Dyke, Woodbury, MN (US); Matthias E. Gurr, Lueneburg (DE); Rituparna Paul, St. Paul, MN (US)

(73) Assignee: H.B. Fuller Company, St.Paul, MN (US)

( * ) Notice: Subject to any disclaimer, the term of this patent is extended or adjusted under 35 U.S.C. 154(b) by 418 days.

(21) Appl. No.: 16/912,215

(22) Filed: Jun. 25, 2020

(65) Prior Publication Data

US 2020/0407609 A1 Dec. 31, 2020

Related U.S. Application Data

(60) Provisional application No. 62/866,142, filed on Jun. 25, 2019.

(51) Int. Cl.
| | |
|---|---|
| C09J 175/04 | (2006.01) |
| C08G 18/32 | (2006.01) |
| C08G 18/42 | (2006.01) |
| C08G 18/76 | (2006.01) |
| C09J 5/06 | (2006.01) |
| C08G 18/48 | (2006.01) |
| C09J 175/08 | (2006.01) |
| C08G 18/40 | (2006.01) |
| C09J 175/06 | (2006.01) |
| C08G 18/12 | (2006.01) |
| C08G 18/30 | (2006.01) |
| C08G 18/66 | (2006.01) |
| C08G 18/62 | (2006.01) |
| C08G 18/28 | (2006.01) |
| C09J 175/14 | (2006.01) |
| C08G 18/20 | (2006.01) |

(Continued)

(52) U.S. Cl.
CPC ............ *C09J 175/04* (2013.01); *C08G 18/12* (2013.01); *C08G 18/2009* (2013.01); *C08G 18/2825* (2013.01); *C08G 18/307* (2013.01); *C08G 18/3203* (2013.01); *C08G 18/3206* (2013.01); *C08G 18/4018* (2013.01); *C08G 18/4063* (2013.01); *C08G 18/42* (2013.01); *C08G 18/4261* (2013.01); *C08G 18/48* (2013.01); *C08G 18/4854* (2013.01); *C08G 18/622* (2013.01); *C08G 18/6216* (2013.01); *C08G 18/664* (2013.01); *C08G 18/6607* (2013.01); *C08G 18/6674* (2013.01); *C08G 18/724* (2013.01); *C08G 18/73* (2013.01); *C08G 18/7671* (2013.01); *C09J 5/06* (2013.01); *C09J 175/06* (2013.01); *C09J 175/08* (2013.01); *C09J 175/14* (2013.01); *C08G 2170/20* (2013.01)

(58) Field of Classification Search
CPC . C09J 175/04; C09J 5/06; C09J 175/14; C09J 175/06; C09J 175/08; C08G 18/3203; C08G 18/4261; C08G 18/7671; C08G 18/2009; C08G 2170/20; C08G 18/12; C08G 18/2825; C08G 18/307; C08G 18/3206; C08G 18/4018; C08G 18/4854; C08G 18/6216; C08G 18/664; C08G 18/6674; C08G 18/724; C08G 18/73; C08G 18/4063; C08G 18/42; C08G 18/48; C08G 18/622; C08G 18/6607
See application file for complete search history.

(56) References Cited

U.S. PATENT DOCUMENTS

| | | | |
|---|---|---|---|
| 4,307,004 | A | 12/1981 | Schuhmacher et al. |
| 4,623,709 | A | 11/1986 | Bauriedel et al. |
| 4,650,817 | A | 3/1987 | Allen, Jr. et al. |
| 4,672,001 | A | 6/1987 | Bravet et al. |
| 5,906,704 | A | 5/1999 | Matsuura et al. |

(Continued)

FOREIGN PATENT DOCUMENTS

| | | | | |
|---|---|---|---|---|
| EP | 693511 | A1 * | 1/1996 | ............ C08G 18/10 |
| EP | 2894181 | | 10/2014 | |

(Continued)

OTHER PUBLICATIONS

Desmodur 2460 M product literature (Jun. 22, 208).

(Continued)

*Primary Examiner* — Rabon A Sergent
(74) *Attorney, Agent, or Firm* — Allison Johnson; Kirsten Stone

(57) ABSTRACT

A moisture curable polyurethane hot melt adhesive composition and a process for making the same are disclosed. The moisture curable polyurethane hot melt adhesive composition includes an isocyanate-terminated polyurethane prepolymer that is the reaction product of a diisocyanate monomer component that includes at least 20% by weight asymmetrical diisocyanate monomer based on the weight of the diisocyanate monomer component and symmetrical diisocyanate monomer, at least one polyol having a number average molecular weight greater than 1000 g/mole, a monofunctional compound that includes one isocyanate-reactive group and has a molecular weight no greater than 400 g/mole, and a multifunctional compound that includes at least two isocyanate-reactive groups and has a molecular weight no greater than 400 g/mole.

18 Claims, No Drawings

(51) Int. Cl.
  *C08G 18/73* (2006.01)
  *C08G 18/72* (2006.01)

(56) References Cited

U.S. PATENT DOCUMENTS

| | | | |
|---|---|---|---|
| 5,998,538 | A | 12/1999 | Meckel et al. |
| 7,914,895 | B2 | 3/2011 | Reid |
| 7,915,321 | B2 | 3/2011 | Baumgart et al. |
| 9,796,808 | B2 | 10/2017 | De Schrijver et al. |
| 10,280,320 | B2 | 5/2019 | Romanato et al. |
| 2004/0162385 | A1 | 8/2004 | Krebs |
| 2004/0259968 | A1 | 12/2004 | Krebs |
| 2005/0032973 | A1* | 2/2005 | Krebs .................. C09J 175/04 524/589 |
| 2005/0137375 | A1 | 6/2005 | Hansen et al. |
| 2005/0137377 | A1 | 6/2005 | Gruenewaelder et al. |
| 2008/0312401 | A1 | 12/2008 | Sato et al. |
| 2017/0275512 | A1 | 9/2017 | Bennour et al. |

FOREIGN PATENT DOCUMENTS

| WO | WO2003055929 | 7/2003 |
|---|---|---|
| WO | WO20140123434 | 8/2014 |

OTHER PUBLICATIONS

Desmodur 44 M product literature (Dec. 4, 2017).
Desmodur Eco N 7300 product literature (Mar. 13, 2019).
Desmodur N 3200 product literature (Jun. 26, 2018).
Desmodur N 3300A product literature (Jun. 1, 2017).
Dynacoll 7000 product literature (prior to Jun. 2019).
Dynacoll AC 1630 product literature (May 4, 2016).
Dynacoll AC 1920 product literature (Jun. 3, 2011).
Desmophen 2061 BD product literature (Apr. 17, 2018).
Piothane product literature (Mar. 21, 2013).
Desmodur Ultra N 3300 product literature (Nov. 14, 2018).
Desmodur Z 4470 BA product literature (Nov. 1, 2017).

* cited by examiner

MOISTURE CURABLE POLYURETHANE HOT MELT ADHESIVE COMPOSITION HAVING LOW LEVELS OF DIISOCYANATE MONOMER

This application claims the benefit of U.S. Provisional Patent Application No. 62/866,142 filed on Jun. 25, 2019, which is incorporated herein.

BACKGROUND

The invention relates to reducing the amount of monomeric diisocyanate content present in moisture curable polyurethane hot melt adhesive compositions.

Moisture curable polyurethane hot melt adhesive compositions are often based on isocyanate-terminated prepolymers (NCO-terminated prepolymers). The NCO-terminated prepolymer reacts in the presence of water, e.g. air humidity, to form urea-based adhesive bonds, while carbon dioxide is eliminated. NCO-terminated prepolymers are often derived from polyols and a molar excess of multifunctional isocyanate such as a monomeric diisocyanate. Often significant amounts of monomeric diisocyanate remain in the NCO-terminated prepolymer composition. The presence of monomeric diisocyanate is undesirable. Therefore, there is a need to reduce the residual amount of monomeric diisocyanate in moisture curable polyurethane hot melt adhesive compositions to less than 0.1% by weight.

A number of approaches have been used in attempts to remove the residual monomeric diisocyanate from isocyanate-reactive compositions. One approach involves vacuum stripping the residual monomeric diisocyanate from the system. Stripping is a costly and time-consuming additional purification step. In an approach that has been applied to polyurethane foams, an isocyanate component, a propellant, a monofunctional alcohol, a catalyst, a stabilizer and polymeric polyols were blended together to try to produce a foam with low residual monomeric diisocyanate (see, e.g., EP 2894181A). In another approach to lowering the monomeric diisocyanate content, an asymmetrical diisocyanate such as diphenyl methane-2,4'-diisocyanate (2,4'-MDI) was reacted with a polyol. Other approaches involve reacting 2,4'-MDI with a diol in a first stage and optionally reacting the resulting reactive polyurethane in a second stage with polyester polyol (see, e.g. US 2004/0162385).

Adding a monofunctional alcohol to an isocyanate-terminated prepolymer can significantly decrease the adhesive properties of the resulting isocyanate-terminated prepolymer. Adding a low molecular weight diol can significantly increase the viscosity of the resulting isocyanate-terminated prepolymer rendering the composition unsuitable for use in commercial adhesive application equipment.

There remains a need to find more efficient and convenient processes for reducing the residual amount of monomeric diisocyanate in moisture curable polyurethane hot melt adhesive compositions to less than 0.1% while also achieving moisture curable polyurethane hot melt adhesive compositions that are useful for commercial applications.

SUMMARY

In one aspect, the invention features a moisture curable polyurethane hot melt adhesive composition that includes an isocyanate-terminated polyurethane prepolymer comprising the reaction product of a diisocyanate monomer component that includes at least 20% by weight 2,4'-diisocyanate monomer based on the weight of the diisocyanate monomer component and at least 10% by weight 4,4'-symmetrical diisocyanate monomer based on the weight of the diisocyanate monomer component, at least one polyol having a number average molecular weight greater than 1000 g/mole, a monofunctional compound that includes one isocyanate-reactive group and has a molecular weight no greater than 400 g/mole, and a multifunctional compound that includes at least two isocyanate-reactive groups and has a molecular weight no greater than 400 g/mole, the moisture curable hot melt adhesive composition including no greater than 0.1% by weight diisocyanate monomer.

In one embodiment, the stoichiometric ratio of isocyanate groups to the sum of the hydroxyl groups present on the polyol, the isocyanate-reactive group of the first monofunctional compound and the isocyanate-reactive groups of the multifunctional compound is from 1.15:1 to 1.35:1.

In some embodiments, the ratio of the weight of the monofunctional compound to the weight of the multifunctional compound is less than 0.5:1. In other embodiments, the ratio of the weight of the monofunctional compound to the weight of the multifunctional compound is less than 0.49:1.

In other embodiments, the moisture curable hot melt adhesive composition further includes a thermoplastic polymer. In another embodiment, the moisture curable hot melt adhesive composition further includes a multifunctional, moisture curing crosslinking agent.

In another aspect, the invention features a process for preparing a moisture curable polyurethane hot melt adhesive composition, where the process includes reacting at least one polyol having a number average molecular weight greater than 1000 g/mole, a monofunctional compound that includes one isocyanate-reactive group and has a molecular weight no greater than 400 g/mole, a multifunctional compound that includes at least two isocyanate-reactive groups and has a molecular weight no greater than 400 g/mole, and a diisocyanate monomer component that includes at least 20% by weight asymmetrical diisocyanate monomer based on the weight of the diisocyanate monomer component and a symmetrical diisocyanate monomer, to form a isocyanate-terminated polyurethane prepolymer, the moisture curable hot melt adhesive composition including no greater than 0.1% by weight diisocyanate monomer. In one embodiment, the process includes a first stage and a second stage, wherein the first stage includes the reacting and the second stage includes adding a multifunctional, moisture curing crosslinking agent, a catalyst, or a combination thereof to the isocyanate-terminated polyurethane prepolymer. In some embodiments, the process further includes adding a thermoplastic polymer. In one embodiment of the process, the diisocyanate monomer component includes at least 20% by weight 2,4'-methylene diphenyl diisocyanate based on the weight of the diisocyanate monomer component.

In another aspect, the invention features a moisture curable polyurethane hot melt adhesive composition that includes an isocyanate-terminated polyurethane prepolymer that includes the reaction product of a diisocyanate monomer component that includes at least 20% by weight asymmetrical diisocyanate monomer based on the weight of the diisocyanate monomer component and a symmetrical diisocyanate monomer, at least one polyol having a number average molecular weight greater than 1000 g/mole, a monofunctional compound comprising one isocyanate-reactive group and having a molecular weight no greater than 400 g/mole, and a multifunctional compound that includes at least two isocyanate-reactive groups and having a molecular weight no greater than 400 g/mole, the moisture curable hot melt adhesive composition including no greater than 0.1% by weight diisocyanate monomer.

In other aspects, the invention features a moisture curable polyurethane hot melt adhesive composition that includes an isocyanate-terminated polyurethane prepolymer that includes the reaction product of a diisocyanate monomer component that includes at least 20% by weight asymmetrical diisocyanate monomer based on the weight of the diisocyanate monomer component and a symmetrical diisocyanate monomer, at least one polyol having a number average molecular weight greater than 1000 g/mole, a monofunctional compound that includes one isocyanate-reactive group and has a molecular weight no greater than 400 g/mole, and a multifunctional compound that includes at least two isocyanate-reactive groups and has a molecular weight no greater than 400 g/mole, the ratio of the weight of the monofunctional compound to the weight of the multifunctional compound being less than 0.5:1, and the sum of the monofunctional compound and the multifunctional compound being from 0.1% by weight to 10% by weight based on the weight of the moisture curable hot melt adhesive composition.

Other features and advantages will be apparent from the following description of the preferred embodiments and from the claims.

Glossary

In reference to the invention, these terms have the meanings set forth below:

The term "isocyanate-reactive group" means a group that reacts with isocyanate.

The term "multifunctional compound" means a compound that includes at least two isocyanate-reactive groups and has a molecular weight that is no greater than 400 grams per mole (g/mole).

DETAILED DESCRIPTION

The moisture curable polyurethane hotmelt adhesive composition includes an isocyanate-terminated polyurethane prepolymer that is the reaction product of an asymmetrical diisocyanate, a symmetrical diisocyanate, at least one polyol having a number average molecular weight (Mn) greater than 1000 g/mole, a monofunctional compound that includes one isocyanate-reactive group and has a molecular weight of no greater than 400 g/mole, and a multifunctional compound that includes at least two isocyanate-reactive groups and has a molecular weight no greater than 400 g/mole. The hotmelt adhesive composition includes no greater than 0.3% by weight, no greater than 0.2% by weight, or even no greater than 0.1% by weight diisocyanate monomer (e.g., residual diisocyanate monomer).

The isocyanate-terminated polyurethane prepolymer preferably includes no greater than 0.3% by weight, no greater than 0.2% by weight, or even no greater than 0.1% by weight diisocyanate monomer based on the weight of the isocyanate-terminated polyurethane prepolymer. The moisture curable hot melt adhesive composition optionally is formulated with components other than the isocyanate-terminated polyurethane prepolymer. As a result, when the moisture curable hot melt adhesive composition is formulated with an isocyanate-terminated polyurethane prepolymer that includes greater than 0.1% by weight diisocyanate monomer based on the weight of the isocyanate-terminated polyurethane prepolymer, the resulting moisture curable hot melt adhesive composition can include no greater than 0.3% by weight, no greater than 0.2% by weight, or even no greater than 0.1% by weight diisocyanate monomer (based on the weight of the moisture curable hot melt adhesive composition) due to the presence of an amount of components other than the isocyanate-terminated polyurethane prepolymer sufficient to reduce the percentage of diisocyanate monomer in the composition as a whole.

The moisture curable hot melt adhesive composition preferably includes at least 20% by weight, at least 25/by weight, at least 30% by weight, at least 35/by weight, no greater than 100% by weight, no greater than 95% by weight, no greater than 90% by weight, no greater than 85% by weight, or even from 25% by weight to 100% by weight of the isocyanate-terminated polyurethane prepolymer.

The ratio of the equivalents of isocyanate-reactive groups contributed by the multifunctional compound to the equivalents of isocyanate-reactive groups contributed by the monofunctional compound preferably is at least 0.5:1, at least 1:1, or at least 2:1.

The stoichiometric ratio of isocyanate groups (NCO) to the sum of the hydroxyl groups (OH) present on the polyol(s), the isocyanate-reactive group of the first monofunctional compound and the isocyanate-reactive groups of the multifunctional compound preferably is no greater than 1.60:1, no greater than 1.50:1, no greater than 1.40:1, no greater than 1.35:1, no greater than 1.25:1, at least 1.10:1, from 1.15:1 to 1.50:1, or even from 1.15:1 to 1.35:1. For ease of reference, this ratio is referred to as the NCO:OH ratio. It is understood that the isocyanate-reactive functional groups of the monofunctional compound and the multifunctional compound can be other than hydroxyl. Therefore, the OH component of the NCO:OH ratio refers broadly to isocyanate-reactive functional groups and not just OH groups.

The ratio of the weight of the monofunctional compound (M) to the weight of the multifunctional compound (D) (M:D) used to form the isocyanate-terminated polyurethane prepolymer preferably is from 0.1:1 to less than 10:1, from 0.1:1 to no greater than 0.6:1, from 0.1:1 to less than 0.5:1, from 0.2:1 to less than 0.5:1, from 0.3:1 to less than 0.5:1, from 0.4:1 to less than 0.5:1, or even from 0.4:1 to less than 0.49:1.

The hotmelt adhesive composition preferably exhibits an increase in viscosity of no greater than 12% per hour, no greater than 8% per hour, or even no greater than 4% per hour, at the application temperature, at 120° C., at 130° C., at 140° C., at 150° C., or even at 160° C.

The hotmelt adhesive compositions can be formulated to exhibit any suitable viscosity including no greater than 30,000 centipoise (cP), no greater than 20,000 cP, no greater than 15,000 cP, no greater than 10,000 cP, or even no greater than 5000 cP at the application temperature, at 160° C., at 150° C., at 140° C., at 130° C., or even at 120° C.

The present inventors have made the surprising discovery that an isocyanate-terminated polyurethane prepolymer can be formed from the reaction of asymmetric diisocyanate, at least one polyol having a Mn greater than 1000 g/mole, a monofunctional compound that has a molecular weight of no greater than 400 g/mole, and a multifunctional compound that has a molecular weight no greater than 400 g/mole in a single stage while maintaining a isocyanate-terminated polyurethane prepolymer that has sufficient reactivity to provide a moisture curable hot melt adhesive composition with useful adhesive properties and a viscosity suitable for use in commercial applicators. Although the isocyanate-terminated polyurethane prepolymer can be formed in a single stage (i.e., the reaction of diisocyanate, polyol, monofunctional compound, and multifunctional compound to form a isocyanate-terminated polyurethane prepolymer), it can also be formed in multiple stages including, e.g., the reaction of diisocyanate and polyol in a first stage followed by reaction with the monofunctional compound and then the multifunctional compound; the reaction of diisocyanate and polyol in a first stage followed by reaction with the multifunctional compound and then the monofunctional compound to form the isocyanate-terminated polyurethane prepolymer; the reaction of diisocyanate and polyol in a first stage followed by reaction with a mixture of the multifunctional compound and the monofunctional compound to form an isocyanate-terminated polyurethane prepolymer; the reaction of diisocyanate, polyol and the monofunctional compound, in a first stage followed by reaction with the multifunctional compound to form an isocyanate-terminated polyurethane prepolymer; the reaction of diisocyanate, polyol and the multifunctional compound in a first stage, followed by reaction with the monofunctional compound to form an isocyanate-terminated polyurethane prepolymer; the reaction of diisocyanate with the monofunctional compound in a first stage followed by reaction with polyol and the multifunctional compound to form an isocyanate-terminated polyurethane prepolymer; the reaction of diisocyanate with the multifunctional compound followed by reaction with polyol and the monofunctional compound to form an isocyanate-terminated polyurethane prepolymer; the reaction of diisocyanate with the monofunctional compound and the multifunctional compound followed by followed by polyol to form a polyurethane prepolymer, and combinations thereof. In each of the aforementioned reactions, single or multiples of the various components can be added. For example, the polyol can be more than one polyol, at least one polyol can be added at each stage, and combinations thereof.

The reaction of diisocyanate, polyol, monofunctional compound, and multifunctional compound in any sequence and combination can occur under a variety of conditions including, e.g., temperatures ranging from 60° C. to 160° C.

Monofunctional Compound

The monofunctional compound includes one isocyanate-reactive functional group, e.g., hydroxyl (e.g., a primary, secondary or tertiary hydroxyl), amine (e.g., a primary amine or secondary amine), thiol (e.g., a primary, secondary or tertiary thiol), and a carboxylic acid group. The monofunctional compound can be branched, unbranched, aromatic, aliphatic and combinations thereof. The monofunctional compound optionally is terminated with a silane group on the end opposite the isocyanate-reactive functional group or an oxazolidine on the end opposite the isocyanate-reactive functional group.

One example of a useful class of monofunctional compounds is alcohols having from 2 to 20 carbon atoms including, e.g., ethanol, propanol, isopropanol, butanol, pentanol, hexanol, cyclohexanol, heptanol, octanol, nonanol, decanol, dodecanol, pentadecanol, hexadecanol, heptadecanol, icosanol, and combinations thereof. Examples of monofunctional compounds that include a silane group include amino propyl trimethoxy silane, amino propyl triethoxy silane, N-phenyl amino propyl trimethoxy silane, bis-(trimethoxy silyl propyl)amine, 4-amino-3,3-dimethyl-butyldimethoxymethylsilane, ethoxy and methoxy/ethoxy versions thereof, and combinations thereof.

The monofunctional compound has a molecular weight that is no greater than 400 grams per mole (g/mole), no greater than 300 g/mole, or even no greater than 200 g/mole.

Multifunctional Compound

The multifunctional compound includes at least two isocyanate-reactive groups. The isocyanate-reactive functional groups are independently selected from hydroxyl (e.g., a primary, secondary or tertiary hydroxyl, and combinations thereof), amine (e.g., a primary amine, a secondary amine, and combinations thereof), thiol (e.g., primary, secondary or tertiary thiols and combinations thereof), carboxylic acid groups, and combinations thereof. The multifunctional compound can be branched, unbranched, aromatic, aliphatic, and combinations thereof. Useful multifunctional compounds include, e.g., ethylene glycol, 1,2-propanediol, 1,3-propanediol, 2,2-dimethyl-1,3-propanediol, 2-methyl propanediol, 1,4-butane diol, 1,3-butane diol, 2,3-butane diol, 1,6-hexanediol, 2,4,4-trimethyl-1,6-hexanediol, 2,2,4-trimethyl-1,6-hexanediol, 1,4-cyclohexanedimethanol, diethylene glycol, triethylene glycol, tetraethylene glycol, dipropylene glycol, tripropylene glycol, tetrapropylene glycol, glycerine, trimethylolpropane, pentaerythritol, hexamethylene diamine, ethylene diamine, 4,4'-methylenebis[N-sec-butylaniline], ethanolamine, isosorbide, alkoxylation products of bisphenol A, alkoxylation products of bisphenol F, alkoxylation products of isomeric dihydroxyanthracenes, alkoxylation products of isomeric dihydroxynaphthalenes, alkoxylation products of catechol, alkoxylation products of resorcinol, alkoxylation products of hydroquinone having no greater than 8 alkoxy units per aromatic hydroxy group, and combinations thereof.

The multifunctional compound optionally includes at least one silane group. Examples of multifunctional compounds that include at least one silane group include [3-(2-aminoethylamino)propyl]trimethoxy silane, [3-(2-aminoethylamino)propyl]methyldimethoxy silane, ureido propyl trimethoxy silane, tris[3-(trimethoxysilyl) propyl]isocyanurate, ethoxy and methoxy/ethoxy versions thereof, and combinations thereof.

The multifunctional compound has a molecular weight that is no greater than 400 grams per mole (g/mole), no greater than 300 g/mole, no greater than 200 g/mole, or even no greater than 150 g/mole.

The sum of the amount of monofunctional compound and multifunctional compound is from 0.1% by weight to 10% by weight, from 0.25% by weight to 5% by weight, from 0.5% by weight to 4% by weight, or even from 0.75% by weight to 3% by weight, based on the total weight of the moisture curable hot melt adhesive composition.

Diisocyanate Monomer Component

The diisocyanate monomer component includes an asymmetrical diisocyanate monomer and a symmetrical monomer. Suitable asymmetrical diisocyanate monomers include aromatic, cycloaliphatic, and aliphatic asymmetrical diisocyanate monomers. The diisocyanate monomer component includes at least 20% by weight, at least 25% by weight, at least 30% by weight, at least 40% by weight, at least 45% by weight, from 20% by weight to 80% by weight, from 25% by weight to 70% by weight, from 30% by weight to 65% by weight, or even from 45% by weight to 60% by weight of an asymmetrical diisocyanate monomer based on the total amount of diisocyanate monomer used to prepare the isocyanate-terminated polyurethane prepolymer. The diisocyanate monomer component preferably includes no greater than 80% by weight, no greater than 75% by weight, no greater than 70% by weight, no greater than 60% by weight, or even no greater than 55% by weight, from 40% by weight to 75% by weight, from 45% by weight to 70% by weight, or even from 45% by weight to 60% by weight symmetrical diisocyanate monomer based on the total amount of diisocyanate monomer used to prepare the isocyanate-terminated polyurethane prepolymer.

Suitable asymmetrical aromatic diisocyanate monomers include, e.g., diphenylmethane-2,4'-diisocyanate (i.e., 2,4'-MDI), toluene diisocyanates (TDI) (e.g., 2,4-TDI), and mixtures thereof. Suitable asymmetrical cycloaliphatic diisocyanates include, e.g., 1-isocyanatomethyl-3-isocyanato-1,5,5-trimethyl-cyclohexane (isophorone diisocyanate, IPDI), 1-methyl-2,4-diisocyanato-cyclohexane, 1,4-diisocyanato-2,2,6-trimethylcyclohexane (TMCDI), hydrogenation products of the aforementioned aromatic diisocyanates (e.g., hydrogenated 2,4'-MDI), and combinations thereof. Suitable asymmetrical aliphatic diisocyanates include, e.g., 1,6-diisocyanato-2,2,4-trimethylhexane, 1,6-diisocyanato-2,4,4-trimethylhexane diisocyanate, lysine diisocyanate and combinations thereof.

Useful examples of symmetrical diisocyanate monomers include diphenylmethane-4,4'-diisocyanate (i.e., 4,4'-MDI), hydrogenated 4,4'-MDI, 2,6-TDI, naphthalene-1,5-diisocyanate (NDI), naphthalene-1,4-diisocyanate (NDI), and mixtures thereof.

Commercially available sources of 2,4'-MDI often include a mixture of 2,4'-MDI, 4,4'-MDI and diphenylmethane-2,2'-diisocyanate (i.e., 2,2'-MDI). Particularly useful sources of 2,4'-MDI include at least 20% by weight, at least 25% by weight or even at least 30% by weight 2,4'-MDI, no greater than 80%, no greater than 70%, or even no greater than 60%, 4,4'-MDI, optionally 2,2'-MDI, and combinations thereof, based on the weight of the diisocyanate monomer, a 50/50 mixture of 2,4'-MDI/4,4'-MDI, a 30/70 mixture of 2,4'-MDI/4,4'MDI, or even a 35/65 mixture of 2,4'-MDI/4,4'MDI.

Useful diisocyanate monomers are commercially available under a variety of trade designations including, e.g., under the DESMODUR series of trade designations from COVESTRO LLC (Pittsburgh, Pennsylvania) including, e.g., DESMODUR 2460 M monomeric diphenylmethane diisocyanate that includes at least 50% 2,4'-MDI, at least 39.2% 4,4'-MDI, and no greater than 0.8% 2,2'-MDI, as reported by the manufacturer.

Polyol

The polyol used in the formation of the isocyanate-terminated prepolymer includes an average hydroxyl functionality of at least about 2 and a number average molecular weight of at least 1000 g/mole, at least 1500 g/mole, from 1000 g/mole to 10,000 g/mole, or even from 1,000 g/mole to 5,000 g/mole. The polyol can be any polyol or combination of polyols suitable for achieving a desired moisture curable adhesive composition and isocyanate-terminated polyurethane prepolymer. Useful classes of polyols include, e.g., polyester polyols, polyether polyols, polycarbonate polyols, polybutadiene polyols, polyacetals, and combinations thereof.

Useful polyester polyols include, e.g., crystalline polyester polyols, amorphous polyester polyols and liquid polyester polyols. Suitable polyester polyols include, e.g., polyester polyols derived from dicarboxylic acids (aliphatic, cycloaliphatic, araliphatic, aromatic and heterocyclic dicarboxylic acids), derivatives of dicarboxylic acids (e.g., anhydrides, esters and acid chlorides), aliphatic diols, cycloaliphatic diols, linear diols, branched diols, and combinations thereof. Examples of useful dicarboxylic acids and anhydrides from which the polyester polyol can be derived include adipic acid, succinic acid, suberic acid, azelaic acid, sebacic acid, dodecanedioic diacid, cyclohexane diacid, glutaric acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids, trimeric fatty acid, trimellitic acid, trimellitic anhydride, and combinations thereof. Examples of useful aliphatic diols from which the polyester polyol can be derived include ethylene glycol, 1,2-propanediol, 1,3-propanediol, 1,4-butanediol, 1,3-butanediol, 2,3-butanediol, 1,4-butenediol, 1,4-butynediol, 1,5-pentanediol, neopentyl glycol, 1,6-hexanediol, hexenediols, hexynediols, 1,7-heptanediol, heptenediols, heptynediols, 1,8-octanediol, octenediols, octynediols, cyclohexane dimethanol, glycerol, trimethylolpropane, pentaerythritol, sorbitol, and glucose, and combinations thereof.

Specific examples of suitable crystalline polyester polyols include poly(hexanediol adipate) polyol, poly(hexanediol adipate neopentyl glycol) polyol, poly(butanediol adipate) polyol, poly-epsilon-caprolactone polyol, poly(hexanediol dodecanedioate) polyol, poly(hexanediol adipic acid terephthalate) polyol, and combinations thereof.

Specific examples of useful amorphous polyester polyols include poly(hexanediol phthalate) polyol, poly(neopentyl glycol adipate) polyol, poly(neopentyl glycol phthalate) polyol, poly(neopentyl glycol hexanediol phthalate) polyol, poly(diethylene glycol phthalate) polyol, poly(ethylene glycol adipic acid terephthalate) polyol, polyethylene terephthalate polyols, random copolymer diols of ethylene glycol, hexane diol, neopentyl glycol, adipic acid and terephthalic acid, and combinations thereof.

Useful commercially available polyester polyols are available under a variety of trade designations include, e.g., DYNACOLL series of trade designations from Evonik (Parsippany, New Jersey) including, e.g., DYNACOLL 7110, 7111, 7130, 7131, 7140 and 7150 amorphous polyester polyols, DYNACOLL 7210, 7230, 7231, 7500 and 7255 liquid polyester polyols, and DYNACOLL 7362, 7360, 7363, 7361, 7381, 7380, 7330, 7320, 7340, 7331, 7390, 7321, and 7490 crystalline polyester polyols.

Suitable polyether polyols include, e.g., homopolymers of propylene oxide, ethylene oxide, and butylene oxide, copolymers of propylene oxide and ethylene oxide, copolymers of propylene oxide and butylene oxide, copolymers of butylene oxide and ethylene oxide, and mixtures thereof. Specific examples of suitable polyether polyols include, e.g., polyethylene glycol, polytetramethylene glycol, polypropylene glycol, and combinations thereof. The polyether polyol copolymers can have a variety of configurations including, e.g., random and block configurations.

Suitable commercially available polyether polyols are available under a variety of trade designations including, e.g., VORANOL 220-056 polyether polyol from Dow Chemical (Midland, Michigan), DESMOPHEN 2061 BD polypropylene ether polyol, ARCOL PPG-2000 polypropylene glycols, ARCOL PPG-1000 polypropylene glycol, and ACCLAIM Polyol 703 from Covestro LLC (Pittsburgh, Pennsylvania), TERATHANE 1000 polyether glycol from Invista North America (Wichita, Kansas), and PolyG polypropylene glycols from Monument Chemical Kentucky LLC (Brandenburg, Kentucky).

Crosslinking Agent

The moisture curable hot melt adhesive composition optionally includes a multifunctional crosslinking agent. Useful crosslinking agents include multifunctional compounds that have an average functionality of greater than two (e.g., greater than two functional groups, at least three functional groups, at least four functional groups, and mixtures thereof) including, e.g., greater than di-isocyanates, tri-isocyanates, tetra-isocyanates, and mixtures thereof. Suitable crosslinking agents are commercially available under a variety of trade designations including, e.g., the DESMODUR series of trade designations from COVESTRO LLC (Pittsburgh, Pennsylvania) including, e.g., DESMODUR N 3300 hexane diisocyanate (HDI) trimer, DESMODUR N 3200A HDI-biuret, DESMODUR ECO N 7300 pentamethylene diisocyanate (PDI) trimer, DESMODUR N 3400 HDI-uretdione, and DESMODUR Z2470 isophorone polyisocyanate.

The moisture curable hot melt adhesive composition optionally includes from 0% by weight to 10% by weight or even from 0.1% by weight to 10% by weight crosslinking agent.

Additional Components

The moisture curable hot melt adhesive composition optionally includes a variety of additional components including, e.g., catalyst, thermoplastic polymer, tackifying agent, plasticizer, wax, stabilizer, antioxidant, fillers (talcs, clays, silicas and treated versions thereof, carbon blacks and micas, microparticles including, e.g., microspheres (e.g., glass microspheres, polymer microspheres, and combinations thereof), ultraviolet (UV) scavengers and absorbers, pigments (e.g., reactive or nonreactive oxides), fluorescing agents, odor masks, adhesion promoters (i.e., silane-based adhesion promoters), surfactants, defoamers, and combinations thereof.

Useful optional catalysts facilitate cure and include ether and morpholine functional groups (e.g., 2,2'-dimorpholinoethylether, di(2,6-dimethyl morpholinoethyl)ether, and 4,4'-(oxydi-2,1-ethanediyl)bis-morpholine), organometallic compounds based on tin, iron, zinc, titanium, bismuth and potassium including, e.g., tin (II) salts of carboxylic acids (e.g., tin (II) acetate), and ethyl hexanoate and diethylhexanoate, dialkyltin (IV) carboxylates. The carboxylic acids used to form the organometallic catalysts can include any number of carbon atoms including, e.g., from 2 to 32 carbon atoms, and can be dicarboxylic acids. Useful acids include, e.g., adipic acid, maleic acid, fumaric acid, malonic acid, succinic acid, pimelic acid, terephthalic acid, phenylacetic acid, benzoic acid, acetic acid, propionic acid and also 2-ethylhexanoic acid, caprylic acid, capric acid, lauric acid, myristic acid, palmitic acid and stearic acid. Examples of catalysts include dibutyltin diacetate, dibutyltin maleate, dibutyltin bis(2-ethylhexanoate), dibutyltin dilaurate, dioctyltin diacetate, dioctyltin maleate, dioctyltin bis(2-ethylhexanoate), dioctyltin dilaurate, tributyltin acetate, bis(β-methoxycarbonylethyl)tin dilaurate, and bis(β-acetylethyl) tin dilaurate.

Suitable catalysts are commercially available under a variety of trade designations including, e.g., JEFFCAT DMDEE 4,4'-(oxydi-2,1-ethanediyl)bis-morpholine, which is available from Huntsman Corp. (Houston, Texas).

The moisture curable hot melt adhesive composition optionally includes from 0.01% by weight to 2% by weight or even from 0.05% by weight to 1% by weight catalyst.

Useful thermoplastic polymers include, e.g., polyvinyl acetates (e.g., ethylene vinyl acetate copolymer), ethylene vinyl acetate/vinyl alcohol copolymers, polyvinyl acetals, polyvinyl butyrals, ethylene vinyl butyrate copolymer, ethylene acrylic acid copolymer, ethylene methacrylic acid copolymer, ethylene acrylamide copolymer, ethylene methacrylamide copolymer, poly(meth)acrylates, (e.g., methyl acrylate, ethyl acrylate, methylmethacrylate, 2-ethylhexylacrylate, 2-ethylhexylmethacrylate, methoxyethylmethacrylate, methoxyethylacrylate, ethylene ethyl acrylate, ethylene n-butyl acrylate, and ethylene hydroxyethyl acrylate), ethylene n-butyl acrylate carbon-monoxide terpolymer, polyacrylonitriles, polyolefins (e.g., polypropylene and polyethylene), thermoplastic polyurethane, butylene/poly (alkylene ether) phthalate, thermoplastic polyester (e.g., thermoplastic polyester/polyether copolymers), ethylene-propylene-diene terpolymers, natural rubber and other polyisoprenes, styrene-butadiene copolymers, acrylonitrile-butadiene copolymers, polybutadienes, polyisobutylenes, polychloroprenes, block copolymers of styrene-butadiene-styrene, styrene-isoprene-styrene and styrene-ethylene-butylene-styrene, polystyrene, acrylonitrile-butadiene-styrene copolymers, polyvinyl chlorides, polyvinylidene chlorides, polytetrafluoroethylenes, polyhexafluoropropylenes, polychlorotrifluoroethylenes, polyvinylfluorides, polyvinylidene fluorides, polyamides, polyethyleneterephthalates, polyoxymethylenes, polycarbonates, polysulfides, polyphenylenesulfides, polysulfones, polyethersulfones, cellulosics, epoxies, polyesters, phenolics, polyurethanes, and combinations thereof.

Useful commercially available thermoplastic polymers include, e.g., thermoplastic polymers available under the DYNACOLL series of trade designations from EVONIK Industries AG (Germany) including, e.g., DYNACOLL AC 1920 methyl methacrylate/n-butyl methacrylate copolymer having a glass transition of 85° C. and a weight average molecular weight of 27,000 g/mol, and DYNACOLL AC 1630 methyl methacrylate/n-butyl methacrylate copolymer having a glass transition of 60° C. and a weight average molecular weight of 55,000 g/mol, thermoplastic polyester elastomers under the HYTREL series of trade designations from DuPont de Nemours, Inc. (Wilmington, Delaware), and. thermoplastic polyester elastomers under the RITEFLEX series of trade designations from Ticona GmbH (Germany).

The moisture curable hot melt adhesive composition optionally includes from 0% by weight to no greater than 60% by weight, at least 5% by weight, at least 10% by weight, from 5% by weigh to 50% by weight, from 10% by weight to 40% by weight, or even from 10% by weight to 30% by weight thermoplastic polymer.

Useful tackifying agents include, e.g., aromatic, aliphatic, and cycloaliphatic hydrocarbon resins, mixed aromatic and aliphatic modified resins, aromatic modified hydrocarbon resins, and hydrogenated versions thereof; terpenes, modified terpenes, and hydrogenated versions thereof; rosin esters (e.g., glycerol rosin ester, pentaerythritol rosin ester, and hydrogenated versions thereof); and combinations thereof. Useful aromatic resins include, e.g., aromatic modified hydrocarbon resins, alpha-methyl styrene resin, coumorone-indene resins, and styrenated terpene resin, polyphenols, polyterpenes, and combinations thereof. Useful aliphatic and cycloaliphatic petroleum hydrocarbon resins include, e.g., branched and unbranched C5 to C9 resins and the hydrogenated derivatives thereof. Useful polyterpene resins include copolymers and terpolymers of natural terpenes (e.g. styrene-terpene, alpha-methyl styrene-terpene, and vinyl toluene-terpene). The moisture curable hot melt adhesive composition optionally includes from 0% by weight to no greater than 60% by weight, at least 0.1% by weight, from 0.1% by weight to 55% by weight, from 1% by weight to 50% by weight, or even from 1% by weight to 45% by weight tackifying agent.

The sum of the optional thermoplastic polymer and the optional tackifying agent in the moisture curable hot melt adhesive composition can be from 0% by weight to no greater than 80% by weight, at least 5% by weight, at least 10% by weight, from 5% by weigh to 75% by weight, from 10% by weight to 70% by weight, from 10% by weight to 60% by weight of the moisture curable hot melt adhesive composition.

One useful class of stabilizers includes carbodiimide stabilizers (e.g., STABAXOL 7000 from Lanxess (Germany).

Examples of useful commercially available antioxidants include IRGANOX 565, 1010 and 1076 hindered phenolic antioxidants available from BASF (Germany), and ANOX 20 hindered phenolic antioxidant from Great Lakes Chemicals (West Lafayette, Indiana). These antioxidants can act as free radical scavengers and can be used alone or in combination with other antioxidants including, e.g., phosphite antioxidants (e.g., IRGAFOS 168 available from BASF). Other antioxidants include CYANOX LTDP thioether antioxidant available from Cytec Industries (Stamford, Conn.), and ETHANOX 330 a hindered phenolic antioxidant available from Albemarle (Baton Rouge, Louisiana).

Examples of useful pigments include inorganic, organic, reactive, and nonreactive pigments, and combinations thereof.

The moisture curable hot melt adhesive composition optionally includes an organofunctional silane adhesion promoter. Preferred organofunctional silane adhesion promoters include silyl groups such as alkoxysilyls, aryloxysilyls, and combinations thereof. Examples of useful alkoxysilyl groups include methoxysilyl, ethoxysilyl, propoxysilyl, butoxysilyl, and acyloxysilyl reactive groups including, e.g., silyl ester of various acids including, e.g., acetic acid, 2-ethylhexanoic acid, palmitic acid, stearic acid, and oleic acid.

Suitable silane-based adhesion promoters include, e.g., epoxy glycidoxy propyl trimethoxy silane, octyltriethoxysilane, methyltrimethoxysilane, beta-(3,4-epoxy cyclohexyl) ethyl trimethoxy silane, methacryloxypropyl trimethoxy silane, alkyloxyiminosilanes, vinyl trimethoxy silane, vinyl triethoxy silane, vinyl methyl dimethoxy silane, and ethoxy and methoxy/ethoxy versions thereof, mercaptopropyl trimethoxysilane, and mixtures thereof.

Suitable commercially available adhesion promoters are available under a variety of trade designations including, e.g., SILQUEST A-187, A-174, A-186, A-171, A-172, A-137, and A-162, all of which are available from Momentive Performance Materials (Waterford, New York).

The moisture curable hot melt adhesive composition optionally includes from 0.1% by weight to 3% by weight, from 0.1% to 2% by weight, or even from 0.2% to 1.5% by weight adhesion promoter.

Use

The moisture curable hot melt adhesive composition can be applied using any suitable application method including, e.g., automatic fine line dispensing, jet dispensing, slot die coating, roll coating, gravure coating, transfer coating, pattern coating, screen printing, spray coating, filament coating, by extrusion, air knife, trailing blade, brushing, dipping, doctor blade, offset gravure coating, rotogravure coating, and combinations thereof. The moisture curable adhesive composition can be applied as a continuous or discontinuous coating, in a single or multiple layers, and combinations thereof.

The moisture curable hot melt adhesive composition can be formulated for application at a variety of temperatures including, e.g., from 60° C. to about 200° C., from 80° C. to 175° C., from 90° C. to 120° C., or even from 120° C. to 160° C.

Optionally, the surface of the substrate to which the moisture curable hot melt adhesive composition is applied is surface treated to enhance adhesion using any suitable method for enhancing adhesion to the substrate surface including, e.g., corona treatments, chemical treatments (e.g., chemical etching), flame treatments, abrasion, and combinations thereof.

The moisture curable hot melt adhesive composition can be formulated to be suitable for use in bonding a variety of substrates including, e.g., rigid substrates (i.e., the substrate cannot be bent by an individual using two hands or will break if an attempt is made to bend the substrate with two hands), flexible substrates (e.g., flexible substrates (i.e., the substrate can be bent using no greater than the force of two hands), porous substrates, conductive substrates, insulating substrates, and combinations thereof, and substrates in a variety of forms including, e.g., fibers, threads, yarns, wovens, nonwovens, films (e.g., polymer film, metallized polymer film, continuous films, discontinuous films, and combinations thereof), foils (e.g., metal foil), sheets (e.g., metal sheet, polymer sheet, continuous sheets, discontinuous sheets, and combinations thereof), and combinations thereof.

Useful substrates include, e.g., polymer (e.g., polycarbonate, polyolefin (e.g., polypropylene, polyethylene, low density polyethylene, linear low density polyethylene, high density polyethylene, polypropylene, and oriented polypropylene, copolymers of polyolefins and other comonomers), polyether terephthalate, ethylene-vinyl acetate, ethylene-methacrylic acid ionomers, ethylene-vinyl-alcohols, polyesters, e.g. polyethylene terephthalate, polycarbonates, polyamides, e.g. Nylon-6 and Nylon-6,6, polyvinyl chloride, polyvinylidene chloride, cellulosics, polystyrene, and epoxy), polymer composites (e.g., composites of a polymer and metal, cellulose, glass, polymer, and combinations thereof), metal (aluminum, copper, zinc, lead, gold, silver, platinum, and magnesium, and metal alloys such as steel, tin, brass, and magnesium and aluminum alloys), carbon-fiber composite, other fiber-based composite, graphene, fillers, glass (e.g., alkali-aluminosilicate toughened glass and borosilicate glass), quartz, boron nitride, gallium nitride, sapphire, silicon, carbide, ceramic, and combinations thereof.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from about 20° C. to about 25° C.) unless otherwise specified.

% NCO Determination

The isocyanate content is determined according to ASTM D2572 entitled, "Standard Test Method for Isocyanate Groups In Urethane Materials or Prepolymers."

% by Weight Residual Diisocyanate Monomer Determination

The % by weight diisocyanate monomer is determined using reverse phase HPLC (high performance liquid chromatography) equipped with a RESTEK ULTRA C18 5 μm, 150×4.6 mm column (or equivalent) and a detector set at a wavelength of 254 nm. The mobile phase used during the gradient elution is an acetonitrile and aqueous ammonium acetate buffer (20 mM, pH 6.0). Standards are prepared according to OSHA Method 47, Analytical Methods Manual (1985), with the following exceptions: 1.4 g of 1-(2-pyridyl) piperazine ("1-2PP") is used instead of 0.7 g in the initial derivatization step and the volume of methylene chloride is not reduced with a stream of dry nitrogen. Test samples are prepared by adding excess 1-2PP to the sample to be tested (approximately 0.5 g weighed to the nearest 0.0001 g), dissolving the sample in dry tetrahydrofuran (THF), and diluting the sample to 50 mL in a volumetric flask with dry THF. The concentration is adjusted to fit within the working range of the standard curve by diluting with the mobile phase solution.

Viscosity Test Method

The melt viscosity is determined at a temperature using a Brookfield Thermosel viscometer model DX2TRVKBO DV2T Extra using a number 27 spindle and a rotation speed sufficient to achieve from 20% to 80% torque.

% Increase in Viscosity per Hour Test Method

The % increase in viscosity per hour is determined by measuring the viscosity of the composition at temperature (T) according to the Viscosity Test Method over a period of hour(s) (t). The lowest viscosity reading is recorded as Vi and the highest viscosity reading over the period of hours (t) is record as Vt. The percentage increase in viscosity per hour is calculated according to the following formula: % Increase in Viscosity per Hour=[[(Vt−Vi)/Vi]*100]/t.

Example 1

A moisture curable hot melt adhesive composition was prepared in three stages. The amounts of each component used were as set forth in Table 1. In the first stage, polypropylene glycol polyol having a Mn of about 2000 was combined with DYNACOLL AC 1630 methyl methacrylate/n-butyl acrylate copolymer under nitrogen and the temperature was increased to 130° C. After the DYNACOLL AC 1630 was completely melted, a vacuum was applied for about 1 hour to dry the mixture. Then PIOTHANE 3500HA crystalline polyester polyol having a Mn of about 3500 and PIOTHANE 3500HD crystalline polyester polyol having a Mn of about 3500 were added to the mixture, the temperature was decreased to 100° C., and vacuum reapplied for about 1 hour to dry the mixture. Then DESMODUR 2460M monomeric MDI, which contained at least 50% by weight 2,4'-MDI, was added to the mixture and the reaction was allowed to proceed for one hour.

In the second stage, diethylene glycol and 1-hexanol were added to the mixture. The mixture was held under nitrogen and allowed to react for two hours.

In the third stage DESMODUR N3300A aliphatic polyisocyanate, DESMODUR ECO N 7300 aliphatic polyisocyanate, and JEFFCAT DMDEE dimorpholinodiethylether were added with stirring until homogeneous and a vacuum applied for about 20 minutes.

The viscosity, % NCO after the second and third stages, and the % residual diisocyanate monomer after the third stage were determined according to the respective test methods set forth above. The viscosity was determined at 130° C. The % increase in viscosity per hour for the hot melt adhesive composition of Example 1 was determined over a period of 4 hours at a temperature of 130° C. The results are set forth in Table 1. The NCO:OH ratio was calculated for stages 1 and 2 and the values are reported in Table 1.

TABLE 1

|  | 1 |
| --- | --- |
| Polypropylene Glycol | 42.69 |
| DYNACOLL AC 1630 | 31.64 |
| PIOTHANE 3500HA | 10.11 |
| PIOTHANE 3500HD | 3.29 |
| DESMODUR 2460M | 9.52 |
| Diethylene Glycol | 0.44 |
| 1-Hexanol | 0.21 |
| DESMODUR N3300A | 1.00 |
| DESMODUR ECO N 7300 | 1.00 |
| DMDEE | 0.10 |
| Stage 1 | |
| NCO:OH | 1.54:1 |
| Stage 2 | |
| % NCO | 0.70 |
| NCO:OH | 1.27:1 |
| Stage 3 | |
| % NCO | 1.12 |
| % Diisocyanate Monomer | 0.069 |
| Viscosity (cP) at 130° C. | 12,050 |
| % Increase in viscosity per hour over a period of 4 hours | 4.1 |

Comparative 1

An isocyanate-terminated polyurethane prepolymer was prepared in a two stage process. In the first stage, 37.51% by weight polytetramethylene ether glycol having a Mn of about 2000 and 37.51% by weight of PIOTHANE 3500HD crystalline polyester polyol having a Mn of about 3500 were added to a reactor, heated to 120° C., and a vacuum was applied for about one hour to dry the mixture. Then the temperature was decreased to 100° C. Then 19.23% by weight LUPRANATE M (4,4'-MDI) was added to the mixture and the reaction was allowed to proceed for one hour.

In the second stage, 1.95% by weight diethylene glycol and 3.75% by weight 1-hexanol were added to the mixture. The mixture was held under nitrogen and allowed to react for four hours. Then 0.05% by weight MODAFLOW acrylic resin was added.

The resulting isocyanate-terminated polyurethane prepolymer had a NCO:OH ratio of 1.18:1, a % NCO of 1.06% and a viscosity of 5387 cP at 120° C. The % increase in viscosity over 1 hour at 120° C. was 4.6%. The residual diisocyanate monomer was 0.367%.

Example 2

An isocyanate-terminated polyurethane prepolymer was prepared in a two stage process. In the first stage, 37.51% by weight polytetramethylene ether glycol having a Mn of about 2000 and 37.51% of PIOTHANE 3500HD crystalline polyester polyol having a Mn of about 3500 were added to a reactor, heated to 120° C., and a vacuum was applied for about one hour to dry the mixture. Then the temperature was decreased to 100° C. Then 19.25% by weight DESMODUR 2460M monomeric MDI, which contained at least 50% by weight 2,4'-MDI, was added to the mixture and the reaction was allowed to proceed for one hour.

In the second stage, 1.94% by weight diethylene glycol and 3.74% by weight 1-hexanol were added to the mixture. The mixture was held under nitrogen and allowed to react for four hours. Then 0.05% by weight MODAFLOW acrylic resin was added.

The resulting isocyanate-terminated polyurethane prepolymer had a NCO:OH ratio of 1.18:1, a % NCO of 1.06%, and a viscosity of 4387 cP at 120° C. The % increase in viscosity over 1 hour at 120° C. was 4.0%. The residual diisocyanate monomer was 0.104%.

Examples 3 and 4

The moisture curable hot melt adhesive compositions of Examples 3 and 4 were prepared according to the process described above in Example 1 with the exception that DYNACOLL AC 1920 methyl methacrylate/n-butyl acrylate copolymer was used instead of DYNACOLL AC 1630, and HOOPOL F-931 crystalline polyester polyol having a Mn of about 3500 was used instead of PIOTHANE 3500HA and PIOTHANE 3500HD. The amounts of each component were as set forth below in Table 2.

For the moisture curable hot melt adhesive compositions of Examples 3 and 4 the viscosity, % NCO after the second and third stages, and the % residual diisocyanate monomer after the third stage were determined according to the respective test methods set forth above with the exception that the viscosity was determined using a number 29 spindle at 120° C. The % increase in viscosity per hour for each of the hot melt adhesive compositions of Examples 3 and 4 was determined over a period of 75 minutes at a temperature of 120° C. The results are set forth in Table 2. The NCO:OH ratios were calculated for stages 1 and 2 and are set forth in Table 2.

TABLE 2

|  | 3 | 4 |
|---|---|---|
| Polypropylene Glycol | 41.426 | 41.459 |
| HOOPOL F-931 | 31.581 | 31.568 |
| DYNACOLL AC 1920 | 7.896 | 7.895 |
| DESMODUR 2460 M | 14.648 | 14.583 |
| Diethylene Glycol | 1.525 | 1.513 |
| 1-Hexanol | 0.985 | 0.955 |
| DMDEE | 0.029 | 0.029 |
| DESMODUR N 3300 | 0.955 | 0.997 |
| DESMODUR ECO N 7300 | 0.955 | 1.002 |
| Stage 1 |  |  |
| NCO:OH | 1.97 | 1.97 |
| Stage 2 |  |  |
| % NCO | 0.84 | 0.85 |
| NCO:OH | 1.20 | 1.20 |
| Stage 3 |  |  |
| % NCO | 1.19 | 1.11 |
| % Diisocyanate Monomer | 0.0679 | 0.0578 |
| Viscosity (cP) at 120° C. | 8820 | 7400 |
| % Increase in viscosity per hour over a period of 75 minutes | 12.9 | 8.0 |

Example 5

A moisture curable hot melt adhesive composition was prepared in two stages. The amounts of each component used were as set forth in Table 3. In the first stage, the polypropylene glycol polyol having a Mn of about 2000 was combined with DYNACOLL AC 1920 methyl methacrylate/n-butyl acrylate copolymer under nitrogen and the temperature was increased to 130° C. After the DYNACOLL AC 1920 was completely melted, a vacuum was applied for about 1 hour to dry the mixture. Then HOOPOL F-931 crystalline polyester polyol having a Mn of about 3500 was added to the mixture, the temperature was decreased to 100° C., and vacuum reapplied for about 1 hour to dry the mixture. Then diethylene glycol and 1-hexanol were added to the mixture. Then DESMODUR 2460M monomeric MDI containing about 50% or more by weight 2,4'-MDI was added to the mixture and the reaction was allowed to proceed for three hours.

In the second stage DESMODUR N3300A aliphatic polyisocyanate, DESMODUR ECO N 7300 aliphatic polyisocyanate, and JEFFCAT DMDEE dimorpholinodiethylether were added with stirring until homogeneous and a vacuum applied for about 20 minutes.

For the moisture curable hot melt adhesive composition of Example 5, the viscosity, % NCO after the first and second stages, and the % residual diisocyanate monomer after the second stage were determined according to the respective test methods set forth above, with the exception that the viscosity was determined using a number 29 spindle at 120° C. The % the increase in viscosity per hour for the hot melt adhesive compositions of Example 5 was determined over a period of 75 minutes at a temperature of 120° C. The results are set forth in Table 3. The NCO:OH ratio was calculated for stage 1 and is set forth in Table 3.

TABLE 3

|  | 5 |
|---|---|
| Polypropylene Glycol | 41.459 |
| HOOPOL F-931 | 31.568 |
| DYNACOLL AC 1920 | 7.895 |
| DESMODUR 2460 M | 14.583 |
| Diethylene Glycol | 1.513 |
| 1-Hexanol | 0.955 |
| DMDEE | 0.029 |
| DESMODUR N 3300 | 0.997 |
| DESMODUR ECO N 7300 | 1.002 |
| Stage 1 |  |
| NCO:OH | 1.20 |
| % NCO | 0.89 |
| Stage 2 |  |
| % NCO | 1.23 |
| % Diisocyanate Monomer | 0.0434 |
| Viscosity (cP) at 120° C. | 8680 |
| % Increase in viscosity per hour over a period of 75 minutes | 7.3 |

Example 6 and Comparative 2

The isocyanate-terminated polyurethane prepolymers of Example 6 and Comparative 2 (C2) were prepared according to the procedure of Example 2 with the exception that LUPRANATE M was used instead of DESMODUR 2460M in Comparative 2. The amounts of each component used were as set forth in Table 4.

For the isocyanate-terminated polyurethane prepolymers of Example 6 and Comparative 2, the viscosity, the % increase in viscosity at 120° C., % NCO after the second stage, and the % residual diisocyanate monomer after the second stage were determined according to the respective test methods set forth above. The results are set forth in Table 4. The NCO:OH ratios were calculated for stages 1 and 2 and are set forth in Table 4.

TABLE 4

|  | C2 | 6 |
|---|---|---|
| PIOTHANE 3500 HD | 37.98 | 37.98 |
| PTMEG 2000 | 37.97 | 37.97 |
| Diethylene Glycol | 3.08 | 3.08 |
| 1-Hexanol | 1.48 | 1.48 |

TABLE 4-continued

|  | C2 | 6 |
|---|---|---|
| DESMODUR 2460M | 0.00 | 19.49 |
| LUPRANATE M | 19.49 | 0.00 |
| Stage 1 | | |
| NCO:OH | 2.60 | 2.60 |
| Stage 2 | | |
| NCO:OH | 1.18 | 1.18 |
| % NCO | 0.99 | 0.99 |
| % Diisocyanate Monomer | 0.2657 | 0.0928 |
| Viscosity (cP) at 120° C. | 34600 | 16200 |
| % Increase in viscosity over a period of 1 hour | 118 | 11.4 |

Other embodiments are within the claims.

What is claimed is:

1. A moisture curable hot melt adhesive composition comprising:
   an isocyanate-terminated polyurethane prepolymer comprising the reaction product of
      a diisocyanate monomer component comprising from 30% by weight to 65% by weight diphenylmethane-2,4'-diisocyanate monomer based on the weight of the diisocyanate monomer component, and at least 10% by weight diphenylmethane-4,4'-diisocyanate monomer based on the weight of the diisocyanate monomer component,
      at least one polyol having a number average molecular weight greater than 1000 g/mole,
      a monofunctional compound comprising one isocyanate-reactive group and having a molecular weight no greater than 400 g/mole, and
      a multifunctional compound comprising at least two isocyanate-reactive groups and having a molecular weight no greater than 400 g/mole,
   the moisture curable hot melt adhesive composition comprising no greater than 0.1% by weight diisocyanate monomer.

2. The moisture curable hot melt adhesive composition of claim 1, wherein the stoichiometric ratio of isocyanate groups to the sum of the hydroxyl groups present on the polyol, the isocyanate-reactive group of the monofunctional compound and the isocyanate-reactive groups of the multifunctional compound is from 1.15:1 to 1.35:1.

3. The moisture curable hot melt adhesive composition of claim 1, wherein the ratio of the weight of the monofunctional compound to the weight of the multifunctional compound is less than 0.5:1.

4. The moisture curable hot melt adhesive composition of claim 1, wherein the ratio of the weight of the monofunctional compound to the weight of the multifunctional compound is less than 0.49:1.

5. The moisture curable hot melt adhesive composition of claim 1 further comprising a thermoplastic polymer.

6. The moisture curable hot melt adhesive composition of claim 1 further comprising a multifunctional crosslinking agent.

7. A process for preparing a moisture curable polyurethane hot melt adhesive composition, the process comprising:
   reacting
      at least one polyol having a number average molecular weight greater than 1000 g/mole,
      a monofunctional compound comprising one isocyanate-reactive group and having a molecular weight no greater than 400 g/mole,
      a multifunctional compound comprising at least two isocyanate-reactive groups and having a molecular weight no greater than 400 g/mole, and
      diisocyanate monomer component comprising
         at least 20% by weight asymmetrical diisocyanate monomer based on the weight of the diisocyanate monomer component, and
         symmetrical diisocyanate monomer,
      to form an isocyanate-terminated polyurethane prepolymer,
   the moisture curable hot melt adhesive composition comprising no greater than 0.1% by weight diisocyanate monomer.

8. The process of claim 7, wherein the process comprises a first stage and a second stage,
   the first stage comprising the reacting, and
   the second stage comprising adding a multifunctional crosslinking agent, a catalyst, or a combination thereof to the isocyanate-terminated polyurethane prepolymer.

9. The process of claim 7 further comprising adding a thermoplastic polymer to the composition.

10. The process of claim 7, wherein the diisocyanate monomer component comprises at least 20% by weight diphenylmethane-2,4'-diisocyanate.

11. The process of claim 7, wherein the diisocyanate monomer component comprises from 30% by weight to 65% by weight asymmetrical diisocyanate monomer based on the weight of the diisocyanate monomer component.

12. A moisture curable hot melt adhesive composition comprising:
   an isocyanate-terminated polyurethane prepolymer comprising the reaction product of
      a diisocyanate monomer component comprising
         from 30% by weight to 65% by weight asymmetrical diisocyanate monomer based on the weight of the diisocyanate monomer component, and
         a symmetrical diisocyanate monomer,
      at least one polyol having a number average molecular weight greater than 1000 g/mole,
      a monofunctional compound comprising one isocyanate-reactive group and having a molecular weight no greater than 400 g/mole, and
      a multifunctional compound comprising at least two isocyanate-reactive groups and having a molecular weight no greater than 400 g/mole,
   the moisture curable hot melt adhesive composition comprising no greater than 0.1% by weight diisocyanate monomer.

13. The moisture curable hot melt adhesive composition of claim 12, wherein the stoichiometric ratio of isocyanate groups to the sum of the hydroxyl groups present on the polyol, the isocyanate-reactive group of the monofunctional compound and the isocyanate-reactive groups of the multifunctional compound being from 1.15:1 to 1.35:1.

14. The moisture curable hot melt adhesive composition of claim 12, wherein the ratio of the weight of the monofunctional compound to the weight of the multifunctional compound is less than 0.5:1.

15. The moisture curable hot melt adhesive composition of claim 12, wherein the ratio of the weight of the monofunctional compound to the weight of the multifunctional compound is less than 0.49:1.

16. The moisture curable hot melt adhesive composition of claim 12 further comprising a thermoplastic polymer.

17. The moisture curable hot melt adhesive composition of claim 12 further comprising a multifunctional crosslinking agent.

18. A moisture curable hot melt adhesive composition comprising:
- an isocyanate-terminated polyurethane prepolymer comprising the reaction product of
  - a diisocyanate monomer component comprising
    - from 30% by weight to 65% by weight asymmetrical diisocyanate monomer based on the weight of the diisocyanate monomer component, and
    - a symmetrical diisocyanate monomer,
  - at least one polyol having a number average molecular weight greater than 1000 g/mole,
- a monofunctional compound comprising one isocyanate-reactive group and having a molecular weight no greater than 400 g/mole, and
- a multifunctional compound comprising at least two isocyanate-reactive groups and having a molecular weight no greater than 400 g/mole,
- the ratio of the weight of the monofunctional compound to the weight of the multifunctional compound being less than 0.5:1, and
- the sum of the monofunctional compound and the multifunctional compound being from 0.1% by weight to 10% by weight based on the weight of the moisture curable hot melt adhesive composition,
- the stoichiometric ratio of isocyanate groups to the sum of the hydroxyl groups present on the polyol, the isocyanate-reactive group of the monofunctional compound and the isocyanate-reactive groups of the multifunctional compound being from 1.15:1 to 1.35:1.

* * * * *